US012809838B2

(12) United States Patent
Pinegger

(10) Patent No.: US 12,809,838 B2
(45) **Date of Patent: *Nov. 24, 2026**

(54) DATABASE SYSTEM FOR A SOCIAL NETWORK USING BLOCKCHAIN TECHNOLOGY

(71) Applicant: GloBra GmbH, Salzburg (AT)

(72) Inventor: Wolfgang Pinegger, Schladming-Rohrmoos (AT)

(73) Assignee: GloBra GmbH, Salzburg (AT)

( * ) Notice: Subject to any disclaimer, the term of this patent is extended or adjusted under 35 U.S.C. 154(b) by 0 days.

This patent is subject to a terminal disclaimer.

(21) Appl. No.: 19/341,770

(22) Filed: Sep. 26, 2025

(65) Prior Publication Data

US 2026/0030628 A1 Jan. 29, 2026

Related U.S. Application Data

(63) Continuation of application No. 17/214,151, filed on Mar. 26, 2021, now Pat. No. 12,430,644, which is a (Continued)

(51) Int. Cl.
*G06F 16/22* (2019.01)
*G06F 16/2455* (2019.01)
(Continued)

(52) U.S. Cl.
CPC .... *G06F 16/2228* (2019.01); *G06F 16/24552* (2019.01); *G06F 21/602* (2013.01);
(Continued)

(58) Field of Classification Search
CPC ................ G06Q 20/401; G06Q 50/01; G06Q 2220/00; G06F 16/24552; G06F 21/602;
(Continued)

(56) References Cited

U.S. PATENT DOCUMENTS

| | | | | |
|---|---|---|---|---|
| 9,300,678 B1 * | 3/2016 | Stack | G06F 21/6218 | |
| 2010/0088364 A1 * | 4/2010 | Carter | H04L 63/105 | 709/217 |

(Continued)

OTHER PUBLICATIONS

Antorweep Chakravorty et al., Ushare: User Controlled Social Media Based on Blockchain, Aug. 28, 2018, ResearchGate, pp. 1-7 (Year: 2018).*

(Continued)

*Primary Examiner* — Nilesh B Khatri
(74) *Attorney, Agent, or Firm* — Myers Wolin, LLC

(57) ABSTRACT

A relational database system for a social network through which a number of users can share data with each other, wherein the data associated with a user is stored as data blocks, the data blocks associated with a user can be managed exclusively by the user, the sharing of data of the data blocks between users in the network is defined by predetermined data chains, wherein each predetermined data chain specifies data from the data associated with a user that the user shares and specifies the user with whom the data is shared, wherein each relation is stored as a data block and can be managed exclusively by the user to whom the data is associated, wherein the predetermined data chains comprise programs that perform functions based on the shared data.

13 Claims, 3 Drawing Sheets

Figure 1:
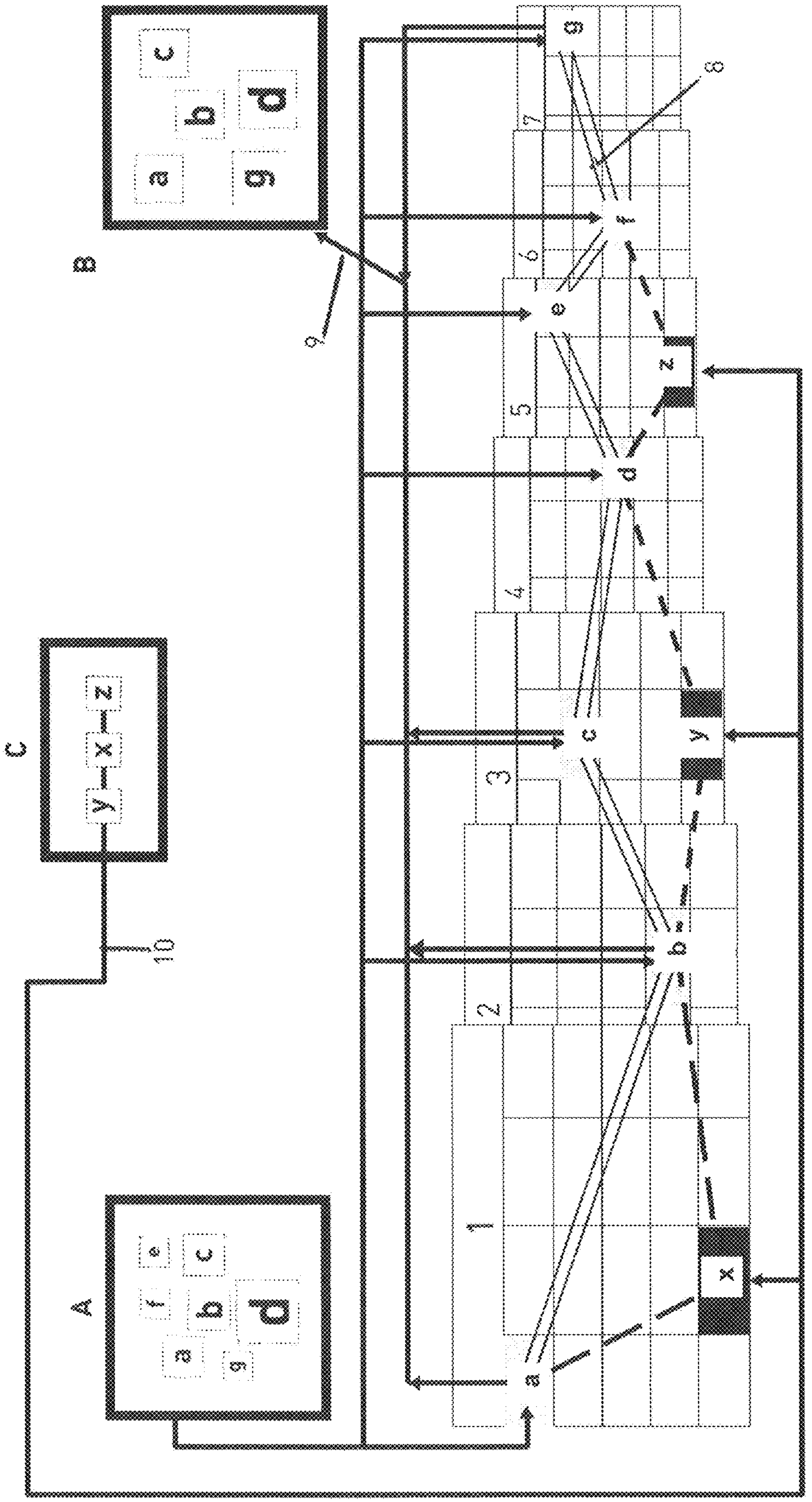

Related U.S. Application Data continuation of application No. PCT/EP2018/076525, filed on Sep. 28, 2018.

(51) Int. Cl.

| | |
|---|---|
| ***G06F 21/60*** | (2013.01) |
| ***G06F 21/62*** | (2013.01) |
| ***G06Q 10/40*** | (2026.01) |
| ***G06Q 20/40*** | (2012.01) |
| ***H04L 9/32*** | (2006.01) |
| *H04L 9/00* | (2022.01) |

(52) U.S. Cl.

CPC ......... *G06F 21/6218* (2013.01); *G06Q 10/40* (2026.01); *G06Q 20/401* (2013.01); *H04L 9/3239* (2013.01); *G06Q 2220/00* (2013.01); *H04L 9/50* (2022.05); *H04L 2209/56* (2013.01)

(58) Field of Classification Search

CPC ..... G06F 21/6218; H04L 9/3239; H04L 9/50; H04L 2209/56

See application file for complete search history.

(56) References Cited

U.S. PATENT DOCUMENTS

| | | | | |
|---|---|---|---|---|
| 2012/0047219 | A1* | 2/2012 | Feng | G06Q 30/02 707/661 |
| 2012/0084253 | A1* | 4/2012 | Labuda | H04M 15/44 707/607 |
| 2013/0007029 | A1* | 1/2013 | Ziemann | G06F 16/9535 707/758 |
| 2015/0178858 | A1* | 6/2015 | Agrawal | G06Q 10/00 705/319 |
| 2016/0203572 | A1* | 7/2016 | McConaghy | G06F 21/16 705/58 |
| 2016/0323109 | A1* | 11/2016 | McCoy | G06Q 50/184 |
| 2018/0096165 | A1* | 4/2018 | Warshavsky | G06F 16/2282 |
| 2018/0203918 | A1* | 7/2018 | Chen | G06F 16/9024 |
| 2018/0227119 | A1* | 8/2018 | Bibera | G06F 16/21 |
| 2019/0327090 | A1* | 10/2019 | Innes | H04L 9/30 |
| 2024/0171552 | A1* | 5/2024 | Ziebell | H04L 63/0428 |

OTHER PUBLICATIONS

International Search Report issued for International Patent Application No. PCT/EP2018/076525 mailed on May 6, 2019.

Antorweep Chakrayorty et al. "Ushare: user controlled social media based on blockchain," Proceedings of the 11th International Conference on Ubiquitous Information Management and Communication, Jan. 5-7, 2017, pp. 1-6, IMCOM '17, Beppu, Japan.

Non-final Office Action issued by The USPTO for U.S. Appl. No. 17/214,151, dated Oct. 4, 2023.

Final Office Action issued by The USPTO for U.S. Appl. No. 17/214,151, dated Jul. 12, 2024.

Non-final Office Action issued by The USPTO for U.S. Appl. No. 17/214,151, dated Jan. 3, 2025.

Notice of Allowance issued by The USPTO for U.S. Appl. No. 17/214,151, mailed on Sep. 2, 2025.

Antonopoulos, Andreas M., "Mastering Bitcoin Unlocking Digital Crypto-Currencies," 2010, pp. 1-253, O'Reilly Media Inc., US.

* cited by examiner

DATABASE SYSTEM FOR A SOCIAL NETWORK USING BLOCKCHAIN TECHNOLOGY

CROSS REFERENCE TO RELATED APPLICATION

The present application is a continuation of U.S. patent application Ser. No. 17/214,151, filed on Mar. 26, 2021, which is a continuation of International Application No. PCT/EP2018/076525, filed on Sep. 28, 2018, the contents of each of which are incorporated herein by reference.

The present invention relates to a database system for a social network with a blockchain as well as a correspondingly designed social network and a method for providing a social network.

The known social networks and online marketplaces take the data of the users and create for themselves a user profile that can be evaluated algorithmically. The data thus belongs to the operator, no longer to the user. He or she can change very little; everything remains stored on the operator's servers. Any further activity by the user is recorded in his profile and evaluated. Often, this is done via access to the user's computer, whereby further data of the user (photos, media library and contacts) are added to the profile. Furthermore, data is exchanged in the background between several providers in order to obtain further data on the user and to obtain an ever improving and more comprehensive profile. This data is now used to operate an algorithmic business model in which the user, when he logs in, is shown things that are supposedly relevant to him and of interest to him, or the data obtained in this way is used for other commercial purposes Everything is now based on this constantly expanding profile data. Deleting data or the entire profile has no effect, because the user profile always remains in the system.

The present invention is based on the object to provide a database system for a social network as well as a social network configured according to the database structure and a method for providing a social network, acing to which the user controls his data himself and can change or delete it at any time or the user group allowed to see of the data.

This object is solved by the systems and methods defined in the claims.

Preferred embodiments of the invention are defined in the dependent claims.

According to the invention, a relational database system for a social network is provided, via which a number of users can share data with each other, wherein

- the data assigned to a user are stored as data blocks in the database system,
- the data blocks assigned to a user can be managed exclusively by the user,
- the sharing of data of the data blocks between users in the social network is defined by predetermined data chains, wherein each data chain specifies data of the data associated with a user that the user shares and specifying the user with whom the data is shared, wherein
- each data chain is stored in the database system and can be managed exclusively by the user to whom the data is assigned, and a program is assigned to at least one data chain that performs predetermined functions based on the data specified by the data chain.

Further, a method for providing a social network through which a number of users can share data with each other is provided, wherein

- the data assigned to a user are stored as data blocks in a relational database system, in particular according to one of the preceding claims,
- wherein the data blocks assigned to a user can be managed exclusively by the user,
- wherein the sharing of data of the data blocks between users in the network is defined by predetermined data chains, each predetermined data chain specifying data of the data assigned to a user which the user shares and specifying the user with whom the data is shared, wherein
- each data chain is stored in the database system and can be managed exclusively by the user to whom the data is assigned, wherein a program is assigned to at least one predetermined data chain that performs a predetermined function based on the shared data.

Further, the invention also provides a social network system comprising a database system according to the invention.

The data chains may be stored as tables, i.e., relations, in the relational database system.

The database system according to the invention, the method and the social network are based on a concept which links the data blocks filled with content by the owner of the data via predetermined or fixed data chains and, if desired by the users involved, stores this data elsewhere in the network where it can only be viewed by the authorized users but is not subject to any further possibility of modification, and from there can be encrypted and transferred to an external blockchain.

Here, the rows and columns of the tables and thus their contents (data blocks) are linked via these data chains. These data chains process, on the one hand, standardized applications that the social network according to the invention offers its users, such as the definition of geography or language, or the possibility to follow another user as an author or to save an online store or an offer as a favorite, and those that the respective other users involved must agree to, as in the case of a friendship connection.

Further, the database of the social network according to the invention allows the definition of additional data chains overlaying the standard data chains according to the wishes of the operators of large communities in the network. These customer-related data chains assign certain attributes and certificates to their users in advance and connect them accordingly.

The database uses a data structure that allows to access and identify individual data, always in a certain relation to other data in this database. The data in the database is stored in data blocks in tables with hundreds, thousands or millions of rows. The tables also include columns with special labels that manage specific types of data.

The invention is described in more detail with reference to the figures. There illustrate FIG. 1 a social network with three exemplary users A, B and C and with data of user A and the corresponding data chains, FIG. 2 an Internal receipt ledger with transition to a blockchain on the network exemplified by FIG. 1; and FIG. 3 the method according to the present invention.

In the following, the structure of tables, rows and columns according to the invention is referred to as a scheme. For example, the database consists of 10,000 tables, each with unlimited rows and columns.

The data blocks of the database can contain any kind of data such as text, images, videos and/or internet links. Users registered with the network can freely use these data blocks for their own data at any time, enter, change or delete their data there and also specify via the data chains which other users may see which of these data.

Via such storage locations in data blocks, users are provided with their own space for storing their data, and via the data chains, each user can decide which of his own data he makes available to which other user. This creates a connection between users, here, commonly referred to as a data chain. These data chains are realized as relations in the relational database, i.e. as tables containing the corresponding data or data blocks. The contents (data or data blocks) linked via data chains are exclusive for the respective user or user group and cannot be used by any other user without the permission of the user to whom the data belong. The data is displayed on a predefined interface on the user's computer/tablet/smartphone, where it can be seen but not saved.

This provides total ownership and control of his or her data to the user, as well as the freedom to determine the group of users who are allowed to see his or her data.

In cases where this freedom to change or delete all data at any time or to change the authorized group of users is disadvantageous and the users involved do not want such changeability, such as when invoices or other documents are created from transactions or certificates are issued or other agreements are made online, the present invention offers solutions to store such data blocks and data chains separately and fixed in the system and no longer changeable and to make them accessible only to the respective authorized users. Furthermore, the present invention provides the use of a blockchain technology to manage such fixed data blocks and data chains stored in the system on a blockchain independently of the system for the authorized users and to make them accessible only to them.

The blockchain technology is also used for the network's own cryptocurrency and can also be used for other cryptocurrencies of other customers of the network.

Transactions in such cryptocurrencies as the payments as well as the confirmation of the underlying transaction are thus mapped in the same wallet on different blockchains.

Figure 2:
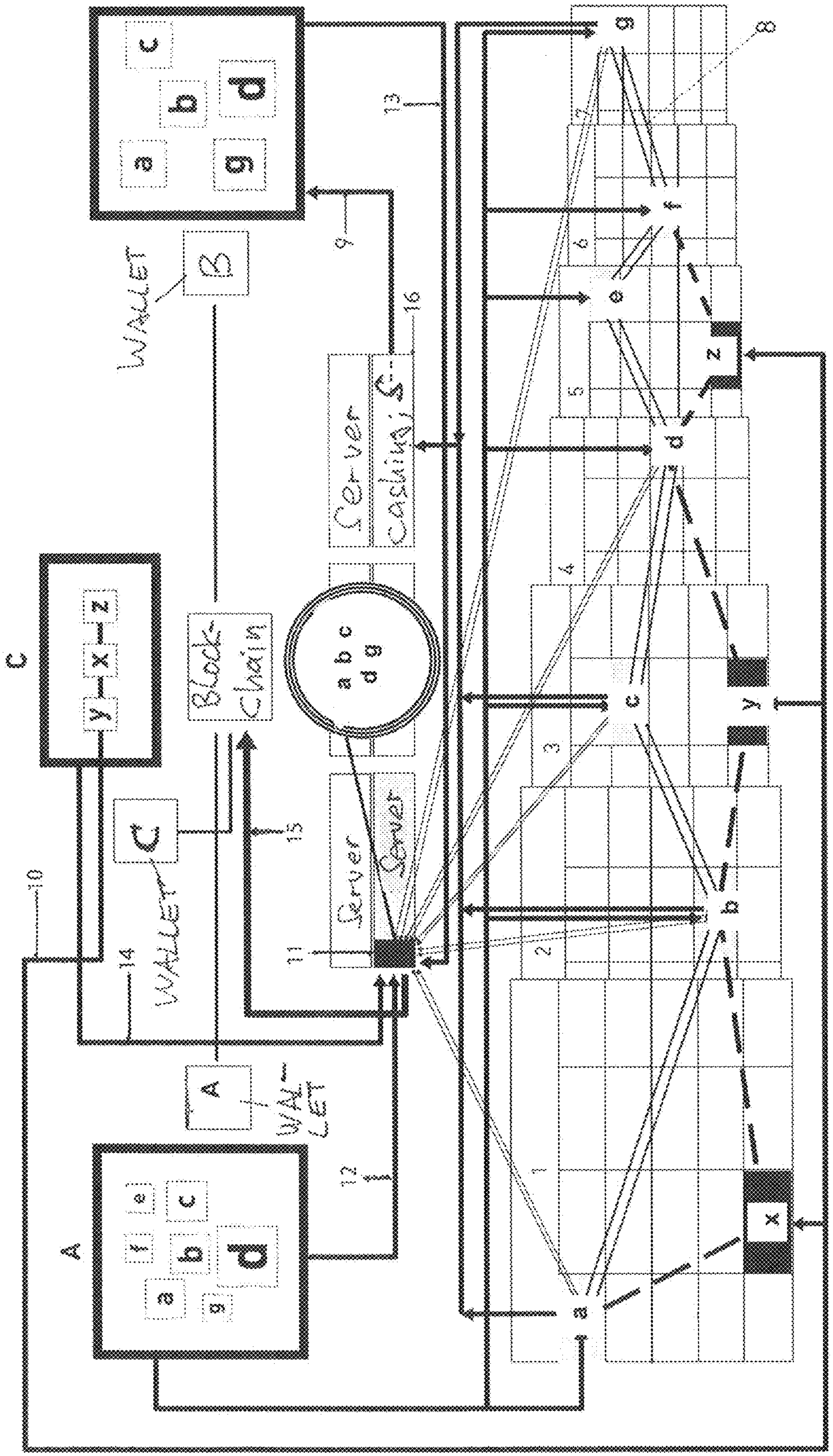

FIG. 1 shows a situation in the social network where a user A has put his data with attributes a, b, c, d, e, f, g as owner in the social network. The data is distributed over several tables 1 to 7 of a relational database and linked via the data chain 8. This creates a new table of the data or data blocks connected by the data chain (relation) 8. The data blocks are managed by the user A as the owner of the data, in the sense that he may change or delete the contents of the data blocks at any time and may also determine with which users of a community he wants to share his data (or parts of it). In the situation of FIG. 1, user A shares his data a, b, c, d and g with user B according to data chain 9. Thus, another table is created with the data according to data chain 9. With the parent user C, A shares the data x, y and z according to data chain 10.

The tables created by these data chains 9, 10 also contain the users B and C with whom the data of the respective table are shared. The data of the users and the data chains can be understood as "smart contracts" between the users about the use of the entered data. With the consent of the respective users, data chains can also be connected to other data chains.

The data chains 8, 9, 10 connect the data blocks of the individual tables, rows and columns of the database via so-called base chains or user-specific chains. Base chains are pre-installed in the system and allow the user (e.g. A) to connect to other users (e.g. B, C), to follow their content, to offer or purchase products, services, jobs or real estate, to view content of certain categories or geographically or according to other filters, or to display it in a certain language.

User-specific chains allow further connections defined by a higher-level user for its defined community. User-specific data chains for large communities enable the connection of all users under a higher-level user C in the manner to be defined by him in each case. To this end, all users additionally connected via such a higher-level data chain also agree in terms of one or more "smart contracts". The users nevertheless remain owners of their data, in the sense that only they have the rights to modify or delete the data or to manage the data chains.

The structure of the database according to the invention allows the owner of the data to freely decide which data he enters into the data blocks and to determine via the data chains which other users he allows to see which of these data.

However, this structure also allows for fixing certain data blocks and data chains in such a way that a proof that no longer can be changed is created, for example, in the form of an invoice for a transaction conducted between users in the network or any other certificate for which a user has applied or which he has received from another user in the system or outside the system, which can also be used as an attribute in the network. The database system provides "internal ledgers" for this purpose. These ledgers are protected storage areas that make data blocks once stored there with their data chains visible to certain authorized users, possibly also printable, but protect them in such a way that they no longer may be permanently changed.

Here the system in the social network confirms that such a confirmation, an invoice, an internal or external or certificate has been issued or any agreement between the parties has been reached by copying all the data blocks with all the data of the users involved linked via the corresponding data chains and storing them elsewhere in the system, where they can then no longer be changed by the owner of the data (or any third party). The data blocks and data chains stored there are referred to here as internal receipt ledgers. The internal receipt ledger 11 (FIG. 2) may be viewed by the users involved at any time, but may only be read or printed out, not changed. This data is stored in the database system of the social network in separate tables of the database, which store the required data blocks and their data chains separately and only for the users involved in the process, but now unchangeably.

To make such confirmations, invoices or certificates even more secure and independent of the social network's servers, a special blockchain technology is used that here is referred to as an external receipt ledger.

According to the invention, a blockchain technology is used which installs so-called masternodes and nodes on several servers and computers owned or operated by others and thus ensures that the blockchain always functions if, for example, more than 50% of these servers are online. These masternodes and nodes represent the external blockchain and generate the necessary public key for the external receipt ledger. Now the data can be transferred in the form of data blocks of the internal receipt ledger connected via data chains to the external receipt ledger and thus become part of the public key and this blockchain. The transfer takes place by transferring the contents of the data blocks present in the internal receipt ledger with the data chains connecting them to the user's local computer. There they are hexadecimally encrypted with the public key of the blockchain and linked to the private key of the authorized user(s). Ideally, this is done on the user's computer, since the network server should not know the user's private key. The result of this encryption may then be stored again on the server and published on the blockchain.

This ensures that the corresponding data on the blockchain may always only be viewed by the authorized user and that the network's IRL system also does not know the private keys of the users involved.

In the case of an invoice, only the users involved can see this invoice in the internal receipt ledger; in the case of a certificate that is published, everyone is able to see this; and in the case of an internal certificate within a group or community, only those involved in it can see this.

The transfer of the contents of an internal receipt ledger to an external receipt ledger may be automatic for all the correspondingly defined relations or certain defined relations of the internal receipt ledger, or only when one of the users involved, whose data blocks and data chains and actions (relations) were used to create the internal receipt ledger, decides to transfer the data consisting of data blocks linked by the corresponding data chains to the public key of the external receipt ledger, i.e. the blockchain. These are usually the users involved in the action and any external entities or other users whose data blocks and data chains were involved in the created ledger agreement, here, referred to as "authorized users." Whenever an authorized user wishes that the data stored in the internal receipt ledger be additionally stored in the external receipt ledger of the blockchain, he or she may trigger this via a mouse click. Each of the other authorized users may do this for themselves later. However, since the data is already available in the public key-protected part of the external key ledger due to the request of the first authorized user, this is used and the other authorized user only gains access to this public key-protected part via his private key.

Now, all authorized users who have chosen the function of transferring data from the internal receipt ledger to the external receipt ledger, i.e. the blockchain, may view this data at any time via their user account in the social network provided on the internal receipt ledger or independently of the internal servers via their wallet and their private key on the external key ledger. A special software, installed on the wallet, allows them to print the data on the blockchain in the same format as they see it on their user account on the social network and use it accordingly.

The system also allows to manage certain information stored in the internal receipt ledger, such as the time expiration of a certain certificate. Any expiration or renewal or modification of the certificate will then be stored on the blockchain in both the internal receipt ledger and the public key of the external receipt ledger accordingly.

The same blockchain technology is also used to create cryptocurrencies on different blockchains that use different masternodes and nodes on different or the same peers or servers.

The social network's own cryptocurrency runs on this technological basis, thus allowing users, once they have set up their wallet, to use their private key to access the public key for both cryptocurrency and the external receipt ledger.

All other cryptocurrencies created on the same technological basis on different blockchains in connection with the social network according to the invention thus allow access via a wallet and a private key and the connection to the external receipt ledger of the network.

Figure 3:
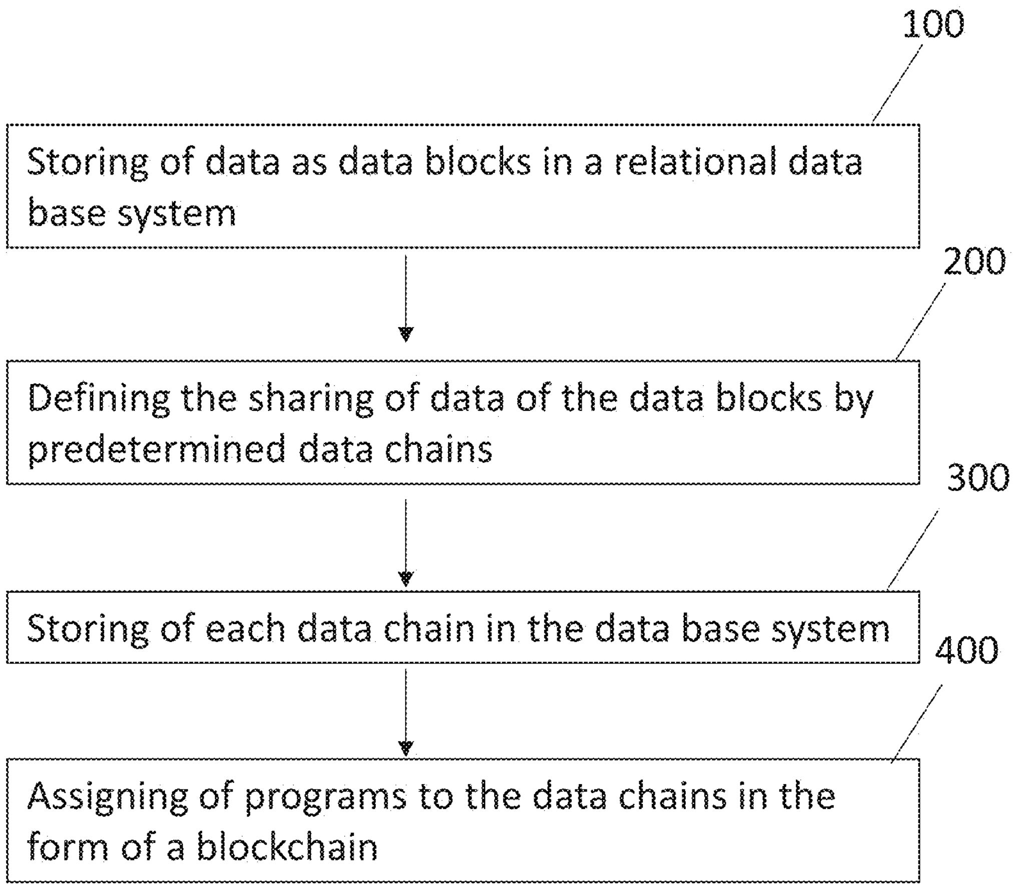

FIG. 3 illustrates the method according to the invention for providing a social network, via which a number of users may share data with one another, wherein in step 100, the data assigned to a user are stored as data blocks in a database system, in particular, according to any one of the previous claims, wherein the data blocks assigned to a user may be managed exclusively by the user, in step 200, the sharing of data of the data blocks between users in the network is defined by predetermined data chains, each data chain specifying data of the data assigned to a user which the user shares and specifying the user with whom the data is shared, wherein in step 300, each data block is stored and may be managed exclusively by the one user to whom the data is assigned, the predetermined data chains comprise programs that perform functions based on the shared data, and wherein in step 400, a program is assigned to at least one predetermined data chain that executes a predetermined function based on the shared data.

Program and Server

One embodiment of the social network according to the invention uses PHP as the programming language for the relational database and MySQL for data management via the data chains. The messaging system is also programmed on PHP, but operates on a Mongo database via a PHP code.

The search engine also uses its own servers with a Sphynx data management.

The social network according to the invention further uses a caching server (on a Radis operating system) to cache the data blocks and data chains (relations) accessible to a user during a session, in order to reduce the load on the rest of the server system with respect to a particular user and his data retrieved during a session.

The use of a caching server system 16 solves this problem, since during a session of a user all data blocks and data chains used thereby are stored there temporarily and only for new data blocks and data chains a renewed and always unique access to the entire database system takes place. The caching server system 16 is arranged between a user (e.g. user B) and the database system according to the invention.

The data cached in the caching server is finally deleted from the caching server system 16 at the end of the respective session. This system allows more efficient use of the database.

A caching system is particularly advantageous in combination with the present database system, since it functions primarily via the data chains and, with each data request, all the data blocks attached to it are converted into a URL and sent to the computer of the requesting (clicking) user. Here, a relational database system alone would be very quickly overloaded, because relational databases are not made to simultaneously serve a large number of data blocks and data chains actively requesting users in the way described.

In this way, the social network may be realized together with a blockchain for the social network with a relational database for the user data, the profiles of the users including the relationships between the users.

This ensures that a user always only uses the server system for a very short time during his session and only for new data.

Furthermore, traffic to/from the user may be controlled better, and the entire database system may be scaled better.

Finally, a caching system also prevents the database system from crashing due to too much traffic. Too much traffic only leads to a longer waiting time for the respective users. The corresponding data blocks and data chains are finally deleted from the caching server when the respective user's session ends or after a certain period of inactivity.

The caching technology also ensures that changes occurring during a session on the part of the owner of the data do not take place for the authorized user and such changes become effective only in a new session.

A similar system of special servers, however, without such deletion after the session or time lapse may be used to store the data of the internal receipt ledger or internal agreement ledger in order not to expose these later changes and then to delete them when the users concerned decide, to hexadecimally encrypt data of the data blocks and their data chains with the public key of the blockchain, and to connect them with the private key(s) of the authorized user(s) and thus send them to the external receipt/agreement ledger and thus transfer them to the blockchain, where the selected activities and data are then stored and documented in an unalterable way. Such servers may, but do not have to, contain the master nodes and serve as nodes or peers of the blockchain with the external receipt ledger. In any case, the data of the internal receipt/agreement ledger are permanently stored on the servers of the network according to the invention. They may, but do not have to, be encrypted from there and transferred to the external receipt ledger, the blockchain.

Here, the network according to the invention uses SkyLedger/SkyFiber technology and the Obelisk system. This allows a variety of blockchains for other cryptocurrencies as well as all sorts of applications to be installed and all opened on one and the same wallet via the private key.

The user in the network according to the invention is on an interface that he is familiar with from comparable social networks and online marketplaces, but the technology behind it looks different, as described above.

Thus, the social network according to the invention merely provides the user with freely usable storage spaces in the database, which he fills with his data. He can use them as he likes, always changing or deleting everything.

Furthermore, he may use the data chains to determine what of his data other users can see. Some data chains also require the action of both users involved in the sense of request and acceptance (e.g. friendship connection).

This means that for each data block and its respective content, which are attached to a defined data chain, a separate Internet identity is created that defines which content is made available to whom and in which form.

A click now means that the computer of the clicking user receives all content released for him by the owner of the data, consisting of text, images, links and videos, etc., and assembles these on his device to form the image he sees. This is an image created on the computer of the receiving user by all the data used by a user in the database that has been called up, i.e. a peer-to-peer use between two acting users.

Each image, as long as the giving user does not change anything, is always the same, defined by the URLs from the tables connected via the data chains.

Only when the interaction of the users results in an invoice or a certification or agreement that should no longer be modifiable, the data blocks attached to the corresponding data chain are fixed and stored separately in the internal receipt ledger, where it no longer allows any changes by the users involved. From there, it may be placed on the blockchain via the external receipt ledger on request of an authorized user.

EMBODIMENT

The database of the social network according to the invention has a basic geographic structure by countries, regions and cities and is currently active in, for example, 224 countries with over 52,000 cities. This list is freely expandable.

This system allows each user to enter his own data in the tables, rows and columns (data blocks) and manage them in it, and also to modify and delete them at any time, and to link these data through the selected data chains, thus making them accessible to a group of users defined by him and freely modifiable. Each user manages his data himself, they belong to him, the social network according to the invention merely provides the storage space and chaining possibilities.

Technically, an action, e.g. a click in the network, leads to its own URL and thus Internet identity with the underlying command to the system to send to the user's computer all content packages permitted for him from all tables, rows and columns and according to the data chains defined by the owner of the data, in order to compile and display the result there.

Each click on this URL, for example if this URL is shared in the net, leads over the connection of the data blocks over the data chains, as far as they have been shared, to the same result at the now requesting users, always however and for each user only for the data, the use of which the owner of the data has agreed over the specified data chains.

Confidentiality settings for the data blocks and the data chains are set only by the user who is the owner of the data, and all data management functions are available only to the owner of the data. Thus, he may change or delete all his data at any time, as well as his entire profile, which permanently deletes all his data blocks and data chains.

This is the technical difference to all other social networks and online marketplaces. The social network according to the invention cannot use or market any user data and does not produce any results from algorithms which are then displayed or marketed to other users-precisely, as the result of an algorithm through which the individual user data pass and the result of which is displayed to other users.

The network according to the invention provides the user with the data blocks to be filled by him in the tables for free use and links these content packages via data chains to the other users selected by him.

Each click now causes the database system to send the content packages consisting of data blocks and data chains with their respective identities to the requesting (clicking) user's computer, where the image is created as the result of the data chain. He can only see it, not save it.

The basis is always exactly what the owner of the data has entered and released for other users.

The social network according to the invention covers all known online needs on a single platform such as presentation, content, community and community management, news and communication, posting and chatting as well as online marketing on the levels of products, service, jobs and real estate, all this on a geographically structured platform freely selectable by the users with automatic translation from and into 106 languages. The translation is done by offering the user a function in which he decides to pass the textual data blocks on the corresponding data chains on his device through the translation tool before displaying them in the language he chooses.

This technical concept is the only way of total data control for all data entered in a freely accessible social platform. It offers users all the functions of social networks and online market platforms on one interface, coupled with total data control, including the definition of who can see the data.

The system of the internal receipt/agreement ledger is for the applications, in which a final fixing of the contents of the concerning data blocks and data chains of the involved users is required, the only possibility to do such fixations within the system that is freely modifiable that otherwise is described as above, by the owner of the data and to make these accessible only for the originally involved users.

The technical concept of the internal receipt/agreement ledger, in which the information of the participating users is stored in the form of data blocks connected via data chains, allows the corresponding hexadecimal encryption and the described transfer to a blockchain.

Thus, any kind of agreements, confirmations and receipts are transferred to a blockchain and managed there. In connection with cryptocurrencies, both the receipt for the transaction and the payment process are thus managed and displayed in the same wallet.

Further Advantages of the System According to the Invention

This system of retrieving information on one's own computer also allows applications that other networks cannot offer in this way.

- Automatic posting in other networks. Here, the necessary data are automatically entered into the posting form of the respective other network.
- Automatic display of all text fields in one of 106 languages. This is done by a link to be activated on the social network according to the invention, in which language the user wants to read all the content, and sending this data through the data chain by the translation program before it is displayed on his device.
- A multi-level marketing program to market the services of the social network according to the invention, where anyone who brings his or her community to the network according to the invention participates permanently in all the revenues of the social network from these users and their users over 5 levels.
- Any kind of certification and corresponding selection and attribution.
- The system of data blocks connected via data chains also allows for special users to set up their own additional overlaying data chains.
- Any kind of further user-oriented multi-level marketing and agency distribution via appropriately defined customer-related data chains.
- Purchase and billing of services via own cryptocurrency or third party cryptocurrencies.
- Profit sharing of sales agents in cryptocurrency.
- Sharing the network's revenue, e.g. for advertising, with the producers of the content to which this advertising is displayed (blogger reward system).
- Displaying all content in a geography that may be freely chosen by the owner of the data possibly connected with offers of defined (certified) sellers under a specially programmed data chain with the corresponding system of smart contracts between such sellers and distributors defined in the system.

Thus, all users who log in through a particular user may be connected to the latter in any way beyond the basic data chains provided.

The blockchain technology in the social network according to the invention has been described at the beginning and enables, amongst others, the following applications:

Blockchain and Cryptocurrencies

The social network according to the invention operates its own cryptocurrency as a so-called In Use Token, which is used as a means of payment for all services offered by the social network according to the invention itself.

The same technology also makes it possible for certain users of the social network according to the invention to create their own cryptocurrencies and operate them in the social network according to the invention. This can be, for example, the planned development aid token as a parallel currency for achieving the 17 SDGs adopted by the United Nations, or also special cryptocurrencies of NGOs that do not form a parallel currency but convert donations into a cryptocurrency only for a specific use and in the event of use in accordance with the contract, i. e. authorized use, provide for their later exchange into the donation money.

Smart Agreements and Smart Contracts

The technology of the social network according to the invention allows confirmations such as invoices or certificates or any type of agreement created via the data blocks and data chains on the so-called internal receipt ledger to be transferred to an external receipt ledger in the form of a blockchain on the request of the parties involved and authorized users, and thus to be made unmodifiable and visible on a wallet of the respective authorized users and to be managed there. Further, it is also possible to make such a smart agreement/smart Contract visible to all users.

Widely Usable Wallet

A wallet is provided for each user in which the user may carry out currency transactions with the cryptocurrencies authorized in the system with other users via a blockchain and/or manage a cryptocurrency.

The user may manage on his wallet via his private key all blockchain contents on different public keys of different blockchains and masternodes and thus all his data on the external receipt ledger and all cryptocurrencies running on blockchains of the social network according to the invention.

Other Possible Applications

The application possibilities are very extensive, as the system allows total data security and data control by the user as well as, whenever the users involved desire this, the creation of an unmodifiable receipt or confirmation of a certification in the server system of the social network according to the invention via the so-called internal receipt ledger. The data recorded there may, if desired, be transferred to a blockchain, where this information then is also stored and confirmed outside the server system of the social network according to the invention permanently, but only visibly for the authorized users.

The use of the blockchain for cryptocurrencies and the connection to the very comprehensive settlement interface of the social network according to the invention enables countless further application possibilities.

This, and the possibility of creating additional data chains for selected users on top of the existing data chains in the social network according to the invention, opens up countless possible applications not yet foreseeable today, especially for very complex communities with very complex tasks.

Application Example Development Aid Token

As is well known, the United Nations is discussing completely new solutions for tackling poverty via the 17 special development goals (SDGs), which require a special user interface combined with blockchain technology. For this purpose, it is planned to introduce a so-called SDG token as a parallel currency not backed by real money.

In addition, many non-governmental organizations (NGOs) want to create their own tokens which are backed by donations and act like a voucher redeemable against them.

This requires not only the creation of their own token with their own blockchain, but also the interface and technology offered by the network of the invention and the described possibilities of the internal and eExternal receipt ledger.

A solution using the social network according to the invention may look as follows:

- Creating an SDG token on the blockchain of the social network according to the invention, as a real parallel currency.
- Creating further NGO tokens, which are deposited directly and with development aid or donation money. This is done with the above NGO tokens, which serve as a voucher. The SDG token has no redeemability, it is a parallel currency that is not backed by any real money.
- The possible recipients of these SDG/NGO tokens are found via local agencies or NGOs, register in the social network according to the invention and are accordingly certified here as selected recipients of these tokens.
- In order to ensure that the tokens are used in the sense of the SDGs/respective NGO and by the respective authorized persons, providers of the products and services register with the social network according to the invention and are in turn certified in the social network according to the invention with these, provided they comply with the SDGs/guidelines of the respective NGO.
- Now all holders of the tokens may use them for all products and services certified in the sense of the SDGs/guidelines of the respective NGO.
- The quality of these products and services is guaranteed by the certification of the providers, in case of complaints this certification will be withdrawn.
- The system of the social network according to the invention provides a unique interface for this processing with all necessary functions.
- The geo-selection is very important, so all users may easily see which products and services are offered against their tokens in their place.
- The automatic translation from and into 106 languages is another indispensable requirement, which today only the social network according to the invention offers in this form.
- The tokens thus given directly to the needy and used for their benefit and in the sense of the SDGs/guidelines of the respective NGO may be exchanged by the certified suppliers in the case of the NGO tokens at the respective NGO for the deposited currency, thus they are destroyed. If the tokens are designed as a true parallel currency as in the case of the SDG tokens, they remain as such in the system. Here, the mining was done through the certification of a user in need, and the use is intended only for corresponding certified providers and for a defined basket of goods to cover basic needs. Other people along the value chain also have such basic needs.
- However, the tokens may also be held by the suppliers and/or must be reused in the system in the case of the SDG token, which gives an additional effect of fighting inflation in many of these inflation-plagued countries.
- The respective state may also be satisfied via a simple tax system as far as the taxes arising on such transactions with the tokens are concerned, in that, for example, a certain percentage of each token may be redeemed by the state at the UN against the deposited money when used as a tax.

This is just one example that shows how unique and enormously powerful the system of the social network according to the invention is in combination with the internal receipt ledger and the associated smart contract/smart agreement blockchain technology.

The invention claimed is:

1. A relational database system for a social network, through which a number of users can share data with each other, the relational database system comprising:

- at least one server, the at least one server having processing circuitry and at least one storage device;
- wherein the storage device is configured to store computer executable instructions, and the processing circuitry, when it executes the computer executable instructions, is configured to:
  - store the data in the at least one storage device as data blocks in tables with a plurality of rows,
  - assign the data blocks to a user, such that the assigned data blocks can be managed exclusively by the user to whom the data blocks are assigned,
  - share the data blocks between individual users, wherein sharing of the data blocks between individual users in the social network is defined by predetermined data chains, each data chain specifying the data blocks assigned to a user, and specifying the user with whom the data blocks are shared, wherein each data chain thus represents a connection between the individual users, and each data chain is formed internally in the social network,
  - store each data chain as a table in the at least one storage device of the relational database system such that the data chain can be managed exclusively by the user to whom the corresponding data blocks are assigned,
  - create one new table upon the sharing of the data blocks with the user, the new table comprising the data chain specifying the data blocks to be shared with the user, and the user with which the data blocks are to be shared,
  - store the one new table with the data blocks according to the data chain in the at least one storage device of the relational database system,
  - assign a predetermined program to the at least one data chain that performs predetermined functions based on the data specified by the data chain,
  - fix each data chain with the corresponding data blocks in such a way that it cannot be modified by any user thereby providing a fixed data chain with corresponding fixed data blocks,
  - confirm, by the fixed data chain with the corresponding fixed data blocks, an agreement achieved between the one user and the user with whom the data blocks are shared, and
  - secure the fixed data chain with the corresponding fixed data blocks on a blockchain independent from the relational database system.

2. The relational database system of claim 1, wherein data of data blocks of multiple users are shared by a concatenation of data chains executing a payment mechanism, said concatenation forming a blockchain.

3. The relational database system of claim 1, wherein one of the functions is a payment mechanism that realizes a currency transaction between two users.

4. The relational database system of claim 1, wherein the fixability of the data chains and the data blocks is ensured in such a way that the data chains and the data blocks are copied and stored at a predetermined location in the social network, where they can no longer be changed by the users.

5. The relational database system of claim 4, wherein the data blocks and data chains stored at the predetermined location in the social network are stored in encrypted form such that only authorized users can access the stored relations.

6. The relational database system of claim 5, wherein the data blocks and data chains stored at the predetermined location in the social network are encrypted and transferred to a blockchain in such a way that only authorized users can access the relations now also stored there via their private key.

7. The relational database system of claim 1, wherein data blocks and/or data chains that a user wishes to have stored as non-modifiable are stored in a predetermined area of the relational database system and can only be accessed by predetermined users.

8. The relational database system of claim 7, wherein the non-modifiable data blocks and/or data chains are encrypted and transferred to the blockchain.

9. The relational database system of claim 1, further comprising:

a caching system associated with a user of the relational database system and configured to cache the data blocks associated with the data chains retrieved from the relational database system by the user during a session and to hold them for retrieval by the user during the session.

10. The relational database system of claim 1, further comprising:

an internal ledger system that is designed to store content as data blocks linked via data chains within the relational database system in a way that cannot be modified by users.

11. The relational database system of claim 10, further comprising:

a caching system associated with a user of the database system and configured to cache the data blocks associated with the data chains retrieved from the relational database system by the user during a session and to hold them for retrieval by the user during the session; and an external ledger system configured to transfer relations of the caching system to the blockchain outside the relational database system and to store them there non-modifiably by the users.

12. The relational database system of claim 11, wherein:

the relational database system is configured to transfer data blocks of the internal ledger system with the data chains connecting them to the computer of a user in order to encrypt them there with a key of the blockchain in order to be linked to the private key of the user.

13. A method for providing a social network via which a number of users can share data with each other, the method comprising:

storing the data in data blocks in tables with a plurality of rows, assigning the data to a user, and storing the data as data blocks in a relational database system, facilitating exclusive management of the stored data blocks by the user to whom the data is assigned, facilitating sharing of data of the data blocks between individual users in the social network, wherein sharing is defined by predetermined data chains, each predetermined data chain specifying data blocks of the data assigned to a user, which the user shares, and specifying the user with whom the data is shared, wherein each data chain represents a connection between the users and wherein each data chain is formed internally in the social network, wherein each data chain is stored as one table in a storage device of the relational database system and is managed exclusively by the user to whom the data is assigned, wherein upon sharing the data blocks with the user, one new table comprising the data chain specifying the data blocks to be shared with the user and the user with which the data blocks are to be shared is created and stored, with the data blocks according to the data chain, in the data storage device, and wherein a predetermined program is assigned to at least one data chain that performs predetermined functions based on the data blocks specified by the data chain, wherein each data chain with the corresponding data blocks is fixable in such a way that it cannot be modified by any user, wherein the database system in the social network confirms, by the fixed data chain with the corresponding fixed data blocks, an agreement achieved between the one user and the user with whom the data blocks are shared, and wherein the fixed data chain with the corresponding fixed data blocks is secured on a block chain outside the network and is managed in the block chain independent from the relational database system.

* * * * *